Aug. 2, 1966   J. E. REESE   3,263,774
CONTROL APPARATUS
Filed June 22, 1964

INVENTOR.
JAMES E. REESE
BY William R. Jacox
ATTORNEY

United States Patent Office 3,263,774
Patented August 2, 1966

3,263,774
CONTROL APPARATUS
James E. Reese, Franklin, Ohio, assignor of one-third to Paul R. Smith, and one-third to John H. Howard, both of Franklin, Ohio
Filed June 22, 1964, Ser. No. 376,776
8 Claims. (Cl. 186—1)

This invention relates to control apparatus. The invention relates more particularly to control apparatus for retail merchandising of the supermarket type.

Ordinarily, in the supermarket type of merchandising a customer uses a basket-cart which is moved by the customer from place to place in the supermarket as the customer places items of merchandise into and/or upon the basket-cart. Usually such a basket-cart has a lower shelf upon which merchandise may be placed by the customer.

After the customer has obtained the merchandise desired, the customer moves the basket-cart to a checkout counter or the like. The customer removes the articles of merchandise from the basket-cart and places them upon the checkout counter to be checked by a checkout clerk as the checkout clerk records the price of each article upon a cash register or the like. The customer then pays the total amount recorded on the cash register. However, frequently, inadvertently or intentionally, a customer leaves an article or articles of merchandise in the basket or upon the lower shelf of the basket-cart and the merchandise may be removed from the supermarket without payment therefor by the customer. The most frequent occurrence is that in which a customer leaves an article or articles of merchandise on the lower shelf of the basket-cart.

If the checkout clerk should specifically observe the basket-cart, particularly the lower shelf thereof before beginning the checkout of the merchandise for the customer, the possibility of merchandise remaining upon the lower shelf or in any other portion of the basket-cart without being accounted for would be negligible.

An object of this invention is to provide control apparatus which assists a checkout clerk in a checkout operation.

Another object of this invention is to provide apparatus which substantially eliminates the possibility of merchandise being carried by a basket-cart past the checkout counter without being observed by the checkout clerk.

Another object of this invention is to provide such apparatus which can be produced and installed at comparatively low costs.

Other objects and advantages reside in the construction of parts, the combination thereof, the method of manufacture, and the mode of operation, as will become more apparent from the following description.

Figure 1:
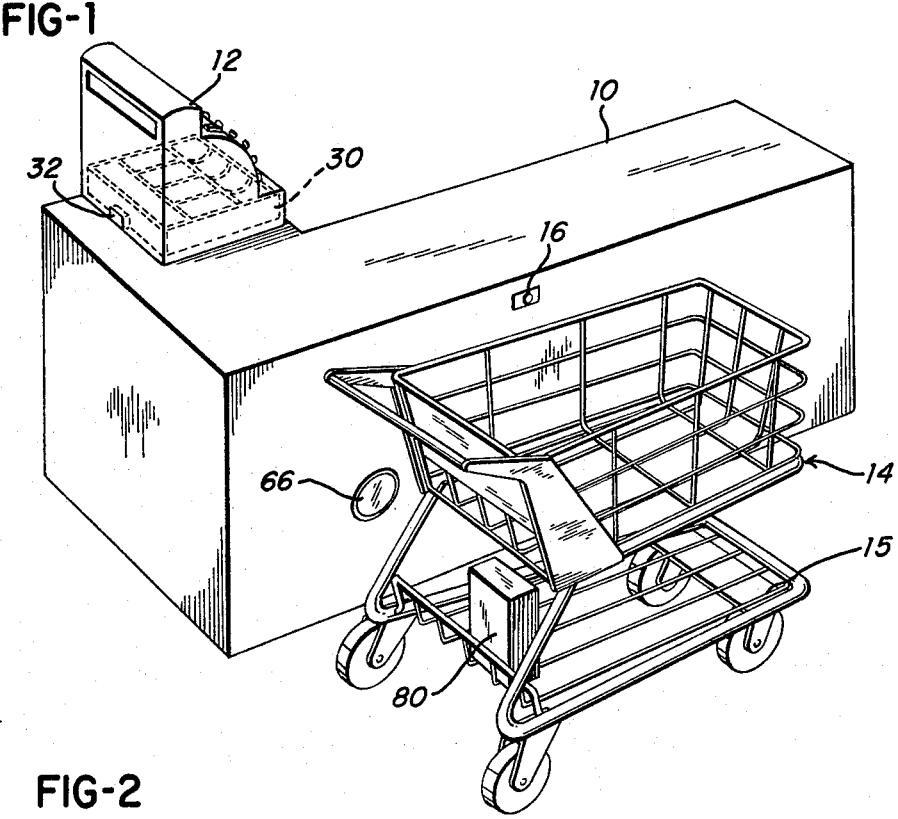
FIGURE 1 is a perspective view showing apparatus of this invention in association with a checkout counter and cash register assembly.

Referring to the drawings in detail, the apparatus of this invention provides means by which a checkout clerk is positively reminded to observe a basket-cart, particularly, the lower shelf thereof to determine if there is merchandise carried by the basket-cart. The checkout clerk's attention is brought to bear upon the basket-cart prior to beginning the operation of checking the merchandise carried by the basket-cart.

FIGURE 1 shows a checkout counter 10 and a cash register 12 adjacent thereto. A basket-cart 14 is positioned at a location substantially as shown when merchandise carried by the basket-cart 14 is removed therefrom and placed upon the checkout counter 10. The basket-cart 14 is shown as having a lower shelf 15.

Figure 2:
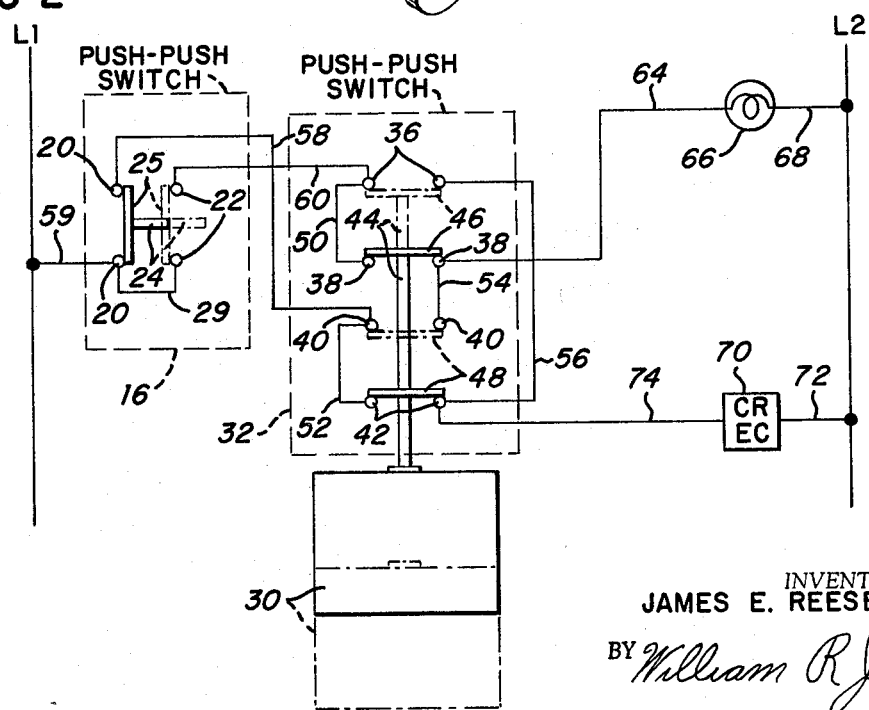
FIGURE 2 shows diagrammatically an electric circuit of the apparatus of this invention.

A manually operable switch 16, such as a push button switch, or other switch or the like is supported by the checkout counter 10 at a position adjacent the position of the basket-cart 14, as shown in FIGURE 1. The switch 16 is, preferably, a switch of the type sometimes referred to as a "push-push" switch. As shown in FIGURE 2, the switch 16 has stationary contacts 20 and stationary contacts 22. The switch 16 has a stem 24 which carries a movable contact member 25. When the stem 24 is pushed, contact is made by the movable contact member 25, for example, between the stationary contacts 20. Any suitable resilient means, not shown, then returns the stem 24 to a normal position. A circuit remains between the stationary contacts 20 until the stem 24 is again pushed. When the stem 24 is again pushed, the movable contact member 25 moves from the contacts 20 and establishes a circuit between the contacts 22. The stem 24 then returns to its normal position. The circuit remains established between the contacts 22 until the stem 24 is again pushed, which moves the movable contact member 25 to the contacts 20 so that a circuit is again established therebetween.

A jumper conductor 29 joins one of the stationary contacts 20 to one of the stationary contacts 22.

The cash register 12 has a cash drawer 30, shown in dotted lines in FIGURE 1. The drawer 30 is also illustrated in FIGURE 2. A switch 32 is mounted behind the drawer 30, as shown in FIGURE 1, or in any other suitable position for operation with movement of the drawer 30. The switch 32, as shown in FIGURE 2 has pairs of stationary contacts 36, 38, 40, and 42.

The switch 32 has a stem 44 which carries movable contact members 46 and 48. The contact member 46 moves between the stationary contacts 36 and 38 for engagement therewith, and the movable contact member 48 moves between the stationary contacts 40 and 42 for engagement therewith. Preferably, the switch 32 is of the type in which a circuit is made upon each push stroke of the stem 44. Thus, for example, when the stem 44 is pushed, a circuit is made between the pair of stationary contacts 38 and the pair of stationary contacts 42. Any suitable resilient means, not shown, causes the stem 44 to return to its normal position while the established circuits remain. Then when the stem 44 is again pushed, the circuits between the pairs of stationary contacts 38 and 42 are opened and circuits are established between the pairs of stationary contacts 36 and 40. The circuits remain established between the pairs of stationary contacts 36 and 40 until the stem 44 is again pushed.

The stem 44 is arranged with respect to the cash drawer 30 so that upon each closing movement of the cash drawer 30, the stem 44 is pushed.

Thus, the movable contact members 46 and 48 move upon each occurrence of the closing of the cash drawer 30 and remain in position until the cash drawer 30 is again closed. Thus, circuits through the switch 32 are changed upon each occurrence of the closing of the cash drawer 30 and remain as established circuits until the next closing movement of the cash drawer 30.

A conductor jumper 50 is shown between one of the stationary contacts 36 and one of the stationary contacts 38. A conductor jumper 52 is shown between one of the stationary contacts 40 and one of the stationary contacts 42. A conductor jumper 54 is also shown between one of the stationary contacts 38 and one of the stationary contacts 40 and a conductor jumper 56 joins one of the stationary contacts 36 to one of the stationary contacts 42.

A conductor 58 joins one of the stationary contacts 20 of the switch 16 to one of the stationary contacts 40 of the switch 32. The other stationary contact 20 is connected by a conductor 59 to a line L1, which is adapted to be joined to a source of electrical energy. A conductor 60 joins one of the stationary contacts 22 of the switch 16 to one of the stationary contacts 36 of the switch 32.

A conductor 64 is connected to one of the stationary contacts 38 and to a lamp 66. The lamp 66 is also connected to a line L2 by means of a conductor 68. The line L2 is adapted to be connected to a source of electrical energy, along with the line L1. Preferably, the lamp 66 is located at a lower position on a side wall of the checkout counter 10, as shown in FIGURE 1, so that when energized, the lamp 66 lights a basket-cart positioned as illustrated by the basket-cart 14.

The cash register 12 has an electric circuit 70 therewithin, shown diagrammatically in FIGURE 2, which ordinarily includes an electric motor and other electrically operated elements. The electric circuit 70 of the cash register 12 is joined to the line L2 by a conductor 72. The electric circuit 70 is also joined to one of the stationary contacts 48 by means of a conductor 74.

*Operation*

As shown in FIGURE 2, the electric circuit 70 of the cash register 12 is electrically energized from the line L2 through the stationary contacts 42 and the movable contact member 48 of the switch 32, through the conductors 52 and 58, through the stationary contacts 20 and the movable contact member 25 of the switch 16, and through the conductor 59 to the line L1.

The checkout clerk may operate the cash register 12 to serve a customer at the checkout counter 10 when the movable contact members 25, 46, and 48 of the switches 16 and 32 are positioned as shown in solid lines in FIGURE 2. In serving the customer, the checkout clerk totals the amounts of the items of merchandise on the cash register 12 and then the checkout clerk must open the cash drawer 30 of the cash register 12 to place the customer's money into the cash drawer 30 and to make change, if necessary.

After the customer's business is transacted the checkout clerk closes the cash drawer 30. This movement of closing the cash drawer 30 operates the stem 44 of the switch 32 so that the movable contact members 46 and 48 are moved and the circuits through the stationary contacts 38 and 42 are opened and circuits are established through the stationary contacts 36 and 40, as illustrated by the dotted lines in FIGURE 2. When such operation of the switch 32 occurs, the electric circuit 70 of the cash register 12 is de-energized. This is due to the fact that there is no circuit between the stationary contacts 42 of the switch 32, and, even though a circuit exists between the stationary contacts 36 of the switch 32, there is no circuit between the stationary contacts 22 of the switch 16. Therefore, the cash register 12 cannot be operated.

Under such conditions, if the checkout clerk should attempt to operate the cash register 12, the checkout clerk finds that the cash register 12 will not operate. Thus, in order to operate the cash register 12, the checkout clerk must operate the switch 16. In order to operate the switch 16 the checkout clerk must reach over to the switch 16 which, as shown in FIGURE 1, is located adjacent the position of a basket-cart 14 when the basket-cart 14 is positioned for the checking of the merchandise from the basket-cart 14.

It should be noted that when the switch 32 was operated by the closing of the cash drawer 30, a circuit was made between the stationary contacts 40. Therefore the lamp 66 became energized through the contacts 40 of the switch 32 and through the contacts 20 of the switch 16 and the basket-cart 14 is illuminated. The lamp 66 thus clearly reveals an article of merchandise such as an article 80 which may be disposed on the lower shelf 15 of the basket-cart 14 or in any other part of the basket-cart 14. Thus, when the checkout clerk reaches over to the switch 16, the checkout clerk can readily observe the basket-cart 14 including the lower shelf 15 thereof. Thus, the checkout clerk quickly and readily becomes aware of any merchandise which may be disposed in the basket-cart 14 or on the lower shelf 15 thereof.

The checkout clerk then operates the switch 16. When this occurs, the movable contact member 25 moves and the circuit between the pair of contacts 20 is opened and a circuit between the pair of contacts 22 is established, as shown in dotted lines in the switch 16 in FIGURE 2. When a circuit is established between the pair of contacts 22, the electric circuit 70 of the cash register 12 is again energized. Also, incidentally, the lamp 66 is de-energized as the circuit between the contacts 20 is opened.

Thus, with the electric circuit 70 of the cash register 12 again energized, the checkout clerk may proceed to use the cash register 12 to record the prices of the merchandise brought to the checkout counter 10 in the basket-cart 14. After the recording of the merchandise for this succeeding customer is completed, the checkout clerk again opens the cash drawer 30 of the cash register 12. Then, after the transaction is completed, the cash drawer 30 is again closed. When this closing movement of the cash drawer 30 occurs, the switch 32 is again operated so that the movable contact members 46 and 48 thereof appear in the manner shown in solid lines in FIGURE 2. When this occurs, the lamp 66 becomes lighted, and the electric circuit 70 of the cash register 12 again becomes de-energized.

Therefore, before the cash register 12 can again be operated, the checkout clerk must again reach over to the switch 16 and operate the switch 16. While operating the switch 16, the checkout clerk is in a position to observe the basket-cart 14 and any merchandise carried thereby.

Therefore, the apparatus of this invention provides means for causing a checkout clerk to observe any merchandise which may be carried by a basket-cart prior to the checking of the merchandise of a customer who uses the basket-cart.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

The invention having thus been described, the following is claimed:

1. In retail merchandising apparatus, in combination with a checkout counter and cash register having a cash drawer, the cash register having an electrical circuit, there being a basket-cart position adjacent the checkout counter at which a basket-cart is disposed during moving of merchandise therefrom to the checkout counter, a manually operated switch carried by the checkout counter adjacent the basket-cart position, the manually operated switch having two contact positions, the positions being alternately established by alternate operations of the switch, a second switch, the second switch being carried by the cash register and operable by closing movement of the cash drawer, the second switch having two contact positions, one of the contact positions being established by each operation of the switch and maintained until the next operation of the switch, which establishes the other contact position, a lamp carried by the checkout counter adjacent the basket-cart position, connection means connecting the switches to a source of electrical energy, electric conductor means joined to the switches and to the lamp and to the electrical circuit of the cash register, so that upon each closing movement of the cash drawer the electrical circuit of the cash register is de-energized until the manually operated switch is operated.

2. For a checkout counter and cash register unit used in retail merchandising, the cash register having a cash drawer, there being a basket-cart postion adjacent the checkout counter, the cash register having an electrical circuit,
- a first two-position switch carried by the cash register and operable from one position to the other position by closing movement of the cash drawer,
- a manually operable two-position switch carried by the checkout counter adjacent the basket-cart position, the manually operable two-position switch being changed from one position to the other position upon each operation thereof,
- a lamp carried by the checkout counter adjacent the basket-cart position,
- electric conductor means connecting the switches one to the other and to the lamp and to the electrical circuit of the cash register so that upon each closing movement of the cash drawer the electrical circuit of the cash register is de-energized and the lamp is energized, and operation of the manually operable switch energizes the electrical circuit of the cash register and de-energizes the lamp.

3. In retail merchandising structure of the type having a checkout counter and an electrically operated cash register, the cash register having an electric circuit, the cash register having a cash drawer, the cash register and checkout counter being operated by a checkout clerk,
- a cash drawer operated switch carried by the cash register, the cash drawer operated switch having two circuit positions, there being a first circuit and a second circuit, only one of the circuits being closed at any given time, one of the circuits being closed by a closing movement of the cash drawer, the other circuit being closed upon the next closing movement of the cash drawer,
- a manually operated switch positioned in spaced relationship from the cash register, the manually operated switch having two circuit positions, there being a first circuit and a second circuit, only one of the circuits being closed at any given time, one of the circuits being closed by each manual operation of the manually operated switch,
- a lamp,
- electric conductor means joining the lamp and the cash register electric circuit to a source of electrical energy,
- electric conductor means joining the lamp and the electric circuit of the cash register to the first circuit and second circuit of the cash drawer operated switch,
- electric conductor means joining the first circuit and the second circuit of the manually operated switch to the source of electrical energy,
- electric conductor means joining the first circuit of the manually operated switch to the second circuit of the cash drawer operated switch,
- electric conductor means joining the second circuit of the manually operated switch to the first circuit of the cash drawer operated switch,
- each closing movement of the cash drawer of the cash register thus de-energizing the electric circuit of the cash register and energizing the lamp, and each operation of the manually operated switch de-energizing the lamp and re-energizing the electric circuit of the cash register.

4. For a cash register and checkout counter assembly operated by checkout personnel and used in retail merchandising, the cash register having a cash drawer and an electric circuit, the improvement comprising:
- cash drawer operated switch means having a plurality of closed positions, one of the closed positions of the cash drawer operated switch means being established upon each closing movement of the cash drawer,
- personnel operable switch means having a plurality of closed positions, one of the closed positions of the personnel operated switch means being established upon each operation thereof by a person operating the checkout counter and cash register,
- conductor means joining the cash drawer operated switch means and the personnel operated switch means to the electric circuit of the cash register so that upon each closing movement of the cash drawer the electric circuit of the cash register is de-energized and the electric circuit of the cash register is re-energized upon operation of the personnel operated switch means.

5. Control apparatus for a checkout counter and an electrically operable cash register assembly operated by a checkout clerk, there being a basket-cart position adjacent the checkout counter, the cash register having a cash drawer,
- electric circuit means connecting the cash register to a source of electrical energy, there being portions of the electric circuit means adjacent the cash drawer and operable thereby and portions of the electric circuit means adjacent the basket-cart position and operable by a checkout clerk, the electric circuit means including means for de-energization of the cash register upon each closing movement of the cash drawer, the electric circuit means including means adjacent the basket-cart position and operable by a checkout clerk for energization of the cash register.

6. In combination with a cash register and checkout counter, the cash register being electrically operable, there being a basket-cart position adjacent the checkout counter,
- electric circuit means joining the cash register to a source of electrical energy, the electrical circuit means including means for de-energization of the cash register upon completion of a given operation of the cash register, the electric circuit means including means adjacent the basket-cart position to re-energize the cash register.

7. In retail merchandising apparatus of the type having a checkout counter and a cash register, there being a basket-cart position adjacent the checkout counter, the cash register having a cash drawer,
- electric circuit means connecting the cash register to a source of electrical energy, the electric circuit means including means operable by movement of the cash drawer to de-energize the cash register, the electric circuit means including means adjacent the basket-cart position to energize the cash register.

8. For retail merchandising structure having a cash register and checkout counter, the cash register having a cash drawer and an electric circuit,
- cash drawer operated switch means adjacent the cash drawer and operable by closing movement thereof,
- manually operable switch means carried by the checkout counter and spaced from the cash register,
- each of the switch means having two closed positions, only one of the positions being closed at any given time, each of the closed positions being established upon alternate operations of the switch means, so that one of the closed positions of the cash drawer operated switch means is established upon closing movement of the cash drawer and the other closed position of the cash drawer operated switch means is established upon the next closing movement of the cash drawer, and one of the closed positions of the manually operable switch means is established when the manually operated switch means is operated and the other closed position thereof is established upon the next operation of the manually operated switch means, electric conductor means connected to the manually operable switch means and to the cash drawer operated switch means and to the electric circuit of the cash register so that upon each closing movement of the cash drawer the electric circuit of the cash register is de-energized until the manually operated switch means is operated.

References Cited by the Examiner
UNITED STATES PATENTS
2,893,517  7/1959  Sundberg _____ 186—1.1

EVON C. BLUNK, *Primary Examiner.*

H. C. HORNSBY, *Assistant Examiner.*